US012494571B2

(12) United States Patent
Lin et al.

(10) Patent No.: US 12,494,571 B2
(45) Date of Patent: Dec. 9, 2025

(54) ELECTRONIC DEVICE WITH INTERFERENCE REDUCTION DEVICE

(71) Applicant: Lenovo (Beijing) Limited, Beijing (CN)

(72) Inventors: Yu-Che Lin, Beijing (CN); Jing Nie, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 177 days.

(21) Appl. No.: 18/361,154

(22) Filed: Jul. 28, 2023

(65) Prior Publication Data

US 2024/0039149 A1 Feb. 1, 2024

(30) Foreign Application Priority Data

Aug. 1, 2022 (CN) ......................... 202210915971.3

(51) Int. Cl.
*H01Q 1/52* (2006.01)
*H01Q 21/28* (2006.01)

(52) U.S. Cl.
CPC ............. *H01Q 1/521* (2013.01); *H01Q 21/28* (2013.01)

(58) Field of Classification Search
CPC ........ H01Q 1/521; H01Q 21/28; H01Q 1/243; H01Q 1/2266; H01Q 1/273; H05K 9/00; H05K 1/0215; H05K 1/0216; H05K 1/0224
See application file for complete search history.

(56) References Cited

U.S. PATENT DOCUMENTS

| | | | | | |
|---|---|---|---|---|---|
| 2,136,659 | A * | 11/1938 | Wood | H04B 1/12 455/284 |
| 4,700,827 | A * | 10/1987 | Haaser | B65G 27/04 198/771 |
| 9,899,737 | B2 * | 2/2018 | Haridas | H01Q 5/371 |
| 10,418,722 | B2 * | 9/2019 | Wium | H01Q 21/062 |
| 10,491,184 | B1 * | 11/2019 | Yan | H03H 7/0115 |
| 10,720,695 | B2 * | 7/2020 | Yu | H01Q 5/335 |
| 10,931,016 | B2 * | 2/2021 | Yun | H01Q 9/42 |
| 11,133,579 | B2 * | 9/2021 | Sonozaki | C08G 63/605 |
| 11,862,877 | B2 * | 1/2024 | Kosaka | H01Q 13/106 |
| 2004/0032371 | A1 * | 2/2004 | Mendolia | H04B 15/02 343/702 |

(Continued)

FOREIGN PATENT DOCUMENTS

| | | | | |
|---|---|---|---|---|
| GB | 2539279 A | * 12/2016 | H01Q 1/52 |
| JP | 2009246560 A | * 10/2009 | |
| WO | WO-2018235593 A1 | * 12/2018 | H01Q 1/525 |

*Primary Examiner* — Dameon E Levi
*Assistant Examiner* — Jordan E. DeWitt
(74) *Attorney, Agent, or Firm* — ANOVA LAW GROUP, PLLC

(57) ABSTRACT

An electronic device includes a first antenna, a second antenna, and an interference reduction device. The first antenna is arranged at a first position. The second antenna is arranged at a second position. The second position is different from the first position. The interference reduction device is arranged at a third position. The third position is different from the first position and the second position. The interference reduction device includes a structural feature configured to couple an electromagnetic wave and reduce radiation of the electromagnetic wave.

11 Claims, 11 Drawing Sheets

(56) References Cited

U.S. PATENT DOCUMENTS

| | | | | |
|---|---|---|---|---|
| 2004/0150562 | A1 * | 8/2004 | Paun | H01Q 9/42 343/700 MS |
| 2004/0164903 | A1 * | 8/2004 | Tran | H01Q 1/38 343/859 |
| 2005/0248500 | A1 * | 11/2005 | Wu | H01Q 1/243 343/702 |
| 2007/0205947 | A1 * | 9/2007 | Boyle | H01Q 1/36 343/702 |
| 2008/0123316 | A1 * | 5/2008 | Chen | H05K 5/062 361/818 |
| 2008/0204347 | A1 * | 8/2008 | Alvey | H01Q 1/523 343/841 |
| 2009/0224987 | A1 * | 9/2009 | Maddaleno | H01Q 13/16 343/702 |
| 2010/0295739 | A1 * | 11/2010 | Wu | H01Q 15/10 343/702 |
| 2012/0013519 | A1 * | 1/2012 | Hakansson | H01Q 1/521 343/835 |
| 2013/0099992 | A1 * | 4/2013 | Wu | H01Q 21/28 343/841 |
| 2015/0054708 | A1 * | 2/2015 | Lin | H01Q 9/045 343/846 |
| 2016/0294048 | A1 * | 10/2016 | Xu | H01Q 1/2291 |
| 2017/0256854 | A1 * | 9/2017 | Hu | H01Q 9/40 |
| 2018/0102210 | A1 * | 4/2018 | Knoll | H01F 27/2852 |
| 2018/0337447 | A1 * | 11/2018 | Shinojima | H01Q 17/008 |
| 2018/0358707 | A1 * | 12/2018 | Jamaly | H01Q 1/48 |
| 2020/0091599 | A1 * | 3/2020 | Nakamura | H01Q 1/38 |
| 2020/0203834 | A1 * | 6/2020 | Asaf | H01Q 9/0414 |
| 2023/0171911 | A1 * | 6/2023 | Maggi | H01L 23/13 361/752 |
| 2023/0223709 | A1 * | 7/2023 | Guntupalli | H01Q 25/001 343/702 |
| 2024/0039149 | A1 * | 2/2024 | Lin | H01Q 1/521 |
| 2024/0097317 | A1 * | 3/2024 | Terashita | H01Q 21/28 |
| 2024/0356212 | A1 * | 10/2024 | Jung | H01Q 1/526 |
| 2024/0388008 | A1 * | 11/2024 | Wei | H01Q 15/24 |
| 2024/0405411 | A1 * | 12/2024 | Cerretelli | H01Q 1/521 |
| 2025/0007180 | A1 * | 1/2025 | Guan | H01Q 9/42 |
| 2025/0015490 | A1 * | 1/2025 | Li | H01Q 1/48 |
| 2025/0087889 | A1 * | 3/2025 | Hu | H01Q 1/243 |

* cited by examiner

ELECTRONIC DEVICE WITH INTERFERENCE REDUCTION DEVICE

CROSS-REFERENCE TO RELATED APPLICATION

This application claims priority to Chinese Patent Application No. 202210915971.3, filed on Aug. 1, 2022, the entire content of which is incorporated herein by reference.

TECHNICAL FIELD

The present disclosure relates to the electronic device technology field and, more particularly, to an electronic device with an antenna.

BACKGROUND

With the continuous development of science and technology, more and more electronic devices with wireless communication capabilities are widely used.

An important component to enable wireless communication of an electronic device is an antenna. To meet a higher communication demand for the electronic device, a plurality of antennas are arranged in the electronic device. However, the plurality of antennas interfere with each other.

SUMMARY

Embodiments of the present disclosure provide an electronic device, including a first antenna, a second antenna, and an interference reduction device. The first antenna is arranged at a first position. The second antenna is arranged at a second position. The second position is different from the first position. The interference reduction device is arranged at a third position. The third position is different from the first position and the second position. The interference reduction device includes a structural feature configured to couple an electromagnetic wave and reduce radiation of the electromagnetic wave.

DETAILED DESCRIPTION OF THE EMBODIMENTS

Embodiments of the present disclosure are described in detail below with reference to the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

To further cause the above objectives, features, and advantages of the present disclosure more easily understandable, the present disclosure is further described in detail in connection with the accompanying drawings and specific embodiments.

Figure 1:
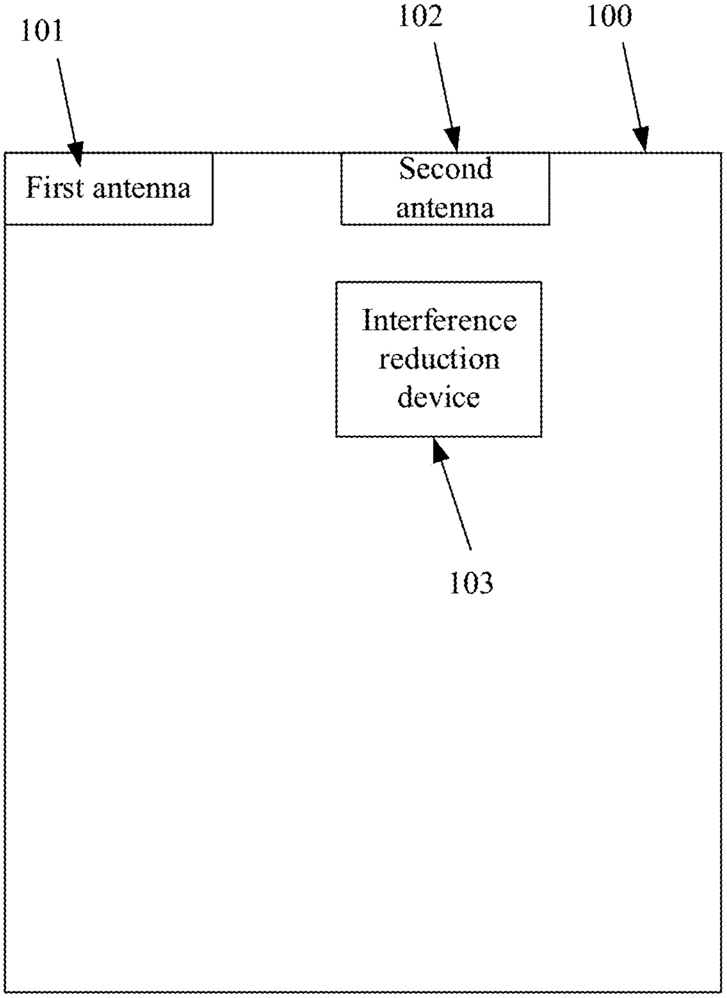
FIG. 1 illustrates a schematic structural diagram of an electronic device according to some embodiments of the present disclosure.

FIG. 1 illustrates a schematic structural diagram of an electronic device 100 according to some embodiments of the present disclosure. The electronic device 100 includes a first antenna 101, a second antenna 102, and an interference reduction device 103.

The first antenna 101 is located at a first position.

The second antenna 102 is located at a second position different from the first position.

The interference reduction device 103 is located at a third position different from the first position and the second position. The interference reduction device 103 can include a structural feature. The structural feature can be configured to be coupled with an electromagnetic wave and reduce the radiation of the electromagnetic wave.

In embodiments of the present disclosure, the electronic device can include the interference reduction device 103. The interference reduction device 103 can be coupled with the electromagnetic wave through the structural feature to reduce the radiation of the electromagnetic wave. Thus, the impact between the first antenna 101 and the second antenna 102 can be reduced.

The first antenna 101 can be excited to generate a radiation path, and the second antenna 102 can be located at the second position along the radiation path. The radiation path can be a path formed by the radiation of the electromagnetic wave generated by exciting the first antenna 101. The third position of the interference reduction device 103 can be at the radiation path from the first antenna 101 to the second antenna 102. The interference reduction device 103 can be coupled with the electromagnetic wave and reduce the radiation of the electromagnetic wave through the structural feature of the interference reduction device 103 to reduce the impact of the radiated electromagnetic wave of the first antenna 101 on the second antenna 102. Thus, the layout of the antenna of the electronic device is shown in FIG. 2.

Figure 2:
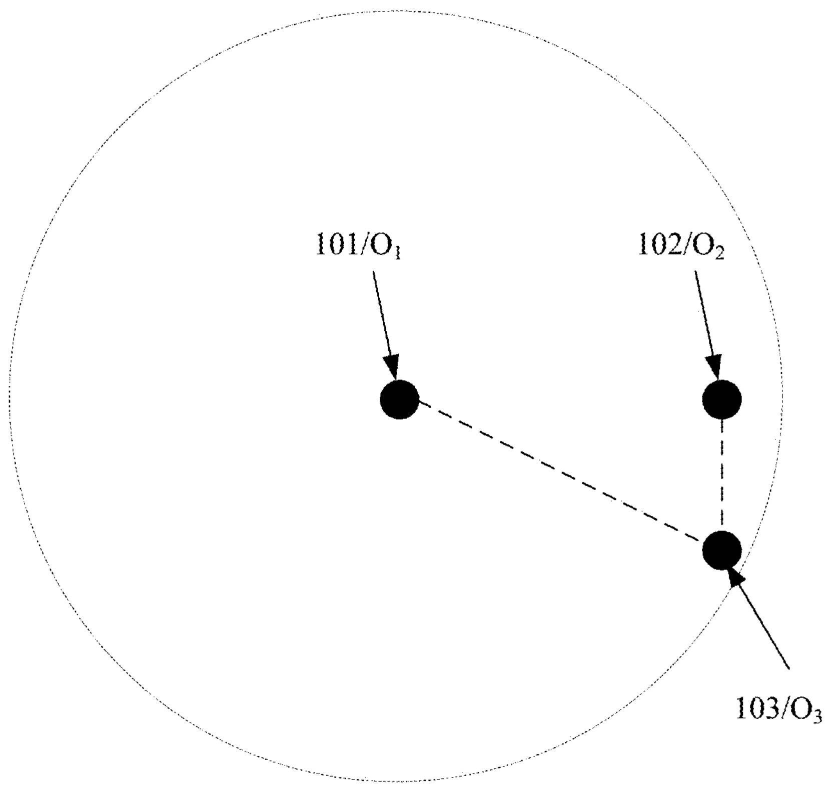
FIG. 2 illustrates a schematic diagram showing an antenna layout principle of an electronic device according to some embodiments of the present disclosure.

FIG. 2 illustrates a schematic diagram showing an antenna layout principle of the electronic device according to some embodiments of the present disclosure. In some arrangements, a geometric center $O_1$ of the first antenna 101 is used as a center of a radiation signal of the first antenna 101. The geometric center $O_1$ of the first antenna 101 can be the first position. A geometric center $O_2$ of the second antenna 102 is used as a center of a radiation signal of the second antenna 102. The geometric center $O_2$ of the second antenna 102 can be the second position. A geometric center $O_3$ of the interference reduction device 103 can be the third position. The radiation path generated by exciting the first antenna 101 can be a spherical area by using the geometric center $O_1$ of the first antenna 1 as a center.

In embodiments of the present disclosure, the radiation path generated by exciting the first antenna 101 is the spherical area using the geometric center $O_1$ of the first antenna 101 as the center as shown in a dotted circle in FIG. 2. In an existing electronic device, with the miniaturization and lightweight design of the electronic device, a space of the electronic device for arranging the antenna can become smaller and smaller. For the first antenna 101 with a wavelength of the radiated electromagnetic wave can be λ1. The interference reduction device 103 is arranged in a range not exceeding λ1/4 to the geometric center $O_1$ of the first antenna 101. Thus, the impact of the radiated electromagnetic wave of the first antenna 101 on the second antenna 102 can be effectively lowered.

When the interference reduction device 103 is arranged along the radiation path generated by the exciting the first antenna 101, the distance between the interference reduction device 103 and the first antenna 101 can be set to be greater than the distance between the interference reduction device 103 and the second antenna 102. That is, a length of a line segment $O_1O_3$ in FIG. 2 is greater than a length of a line segment $O_2O_3$. Thus, on one aspect, the radiation performance of the first antenna 101 can be ensured. On another aspect, the interference reduction device 103 can be closer to the second antenna 102 and can better absorb the interference of an electromagnetic wave of another radiator on the second antenna 102.

Figure 3:
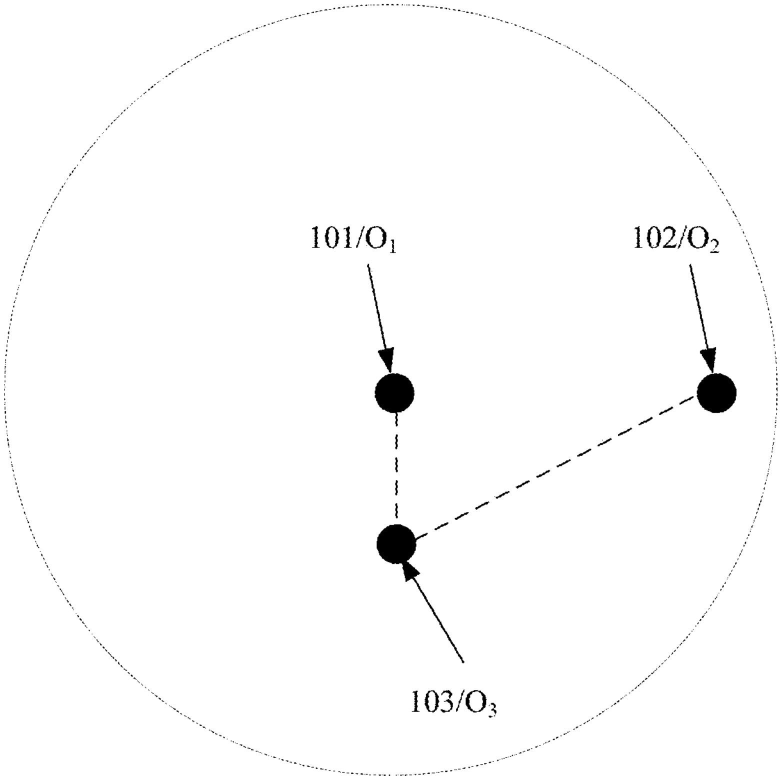
FIG. 3 illustrates a schematic diagram showing another antenna layout principle of an electronic device according to some embodiments of the present disclosure.

In some other embodiments, the antenna layout in the electronic device is also shown in FIG. 3.

FIG. 3 illustrates a schematic diagram showing another antenna layout principle of the electronic device according to some embodiments of the present disclosure. In some embodiments, if the second antenna 102 is excited to generate a radiation path, the first position of the first antenna 101 is located along the radiation path. The radiation path is formed by the radiation of the electromagnetic wave generated by exciting the second antenna 102. Meanwhile, the third position of the interference reduction device 103 is located along the radiation path from the second antenna 102 to the first antenna 101. By arranging the first antenna 101 on the radiation path generated by exciting the second antenna 102, the first antenna 101 can be coupled with the electromagnetic wave through the structural feature of the first antenna 101 and reduce the radiation of the electromagnetic wave. Thus, the interference of the radiated electromagnetic wave of the second antenna 102 on the first antenna 101 can be reduced.

As shown in FIG. 3, the radiation path generated by exciting the second antenna 102 is a spherical area with the geometric center $O_2$ of the second antenna 102 as indicated by a dotted circle in FIG. 3. Thus, corresponding to the second antenna 102 with the radiated electromagnetic wave having a wavelength of μ2, when the inference reduction device 103 is arranged in a range to the geometric center $O_2$ not exceeding μ2/4, the inference of the radiated electromagnetic wave of the second antenna 102 on the first antenna 101 can be effectively lowered.

When the interference reduction device 103 is arranged along the radiation path generated by exciting the second antenna 102, the distance between the interference reduction device 103 and the second antenna 102 can be set to be greater than the distance between the interference reduction device 103 and the first antenna 101. That is, the length of the line segment $O_2O_3$ in FIG. 3 is greater than the length of the line segment $O_1O_3$. Thus, in an aspect, the radiation performance of the second antenna 102 can be ensured. On another aspect, the interference reduction device 103 is closer to the first antenna 101 and can better absorb the interference of the electromagnetic wave of another radiator on the first antenna 101.

Figure 4:
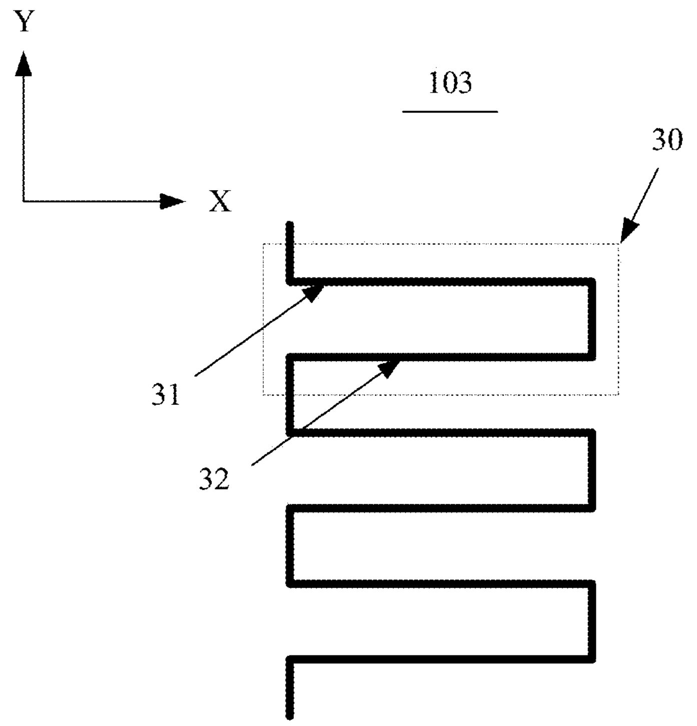
FIG. 4 illustrates a schematic structural diagram of an interference reduction device according to some embodiments of the present disclosure.

FIG. 4 illustrates a schematic structural diagram of the interference reduction device 103 according to some embodiments of the present disclosure. The interference reduction device 103 includes at least one structural feature 30. The structural feature 30 includes a bent metal component. In some embodiments, the structural feature 30 can be a metal sheet with a predetermined shape or a metal wire. The material of the structural feature 30 can include copper or iron.

As shown in FIG. 4, the structural feature 30 includes a first member 31 and a second member 32 that at least partially overlap in a reference direction based on a first reference plane XY, and a third member 33 connecting the first member 31 and the second member 32.

Since coupled current directions cancel out with each other, the radiation performance of the structure depicted by the structural feature can deteriorate. However, the structure can still retain the ability of coupling energy. The structural feature can couple energy in. However, energy that is radiated out can be less than energy that is absorbed through coupling.

In some embodiments of the present disclosure, the reference direction includes at least one of a first reference direction X or a second reference direction Y.

The second reference direction Y is perpendicular to the first reference direction X. The second reference direction Y intersects the first reference direction X perpendicularly, and the plane on which the first reference direction X and the second reference direction Y intersect can be the first reference plane XY.

In some embodiments of the present disclosure, extension directions of the first member 31 and the second member 32 can be the same. The first member 31 and the second member 32 can at least partially overlap in the reference direction. An extension direction of the third member 33 can be perpendicular to the extension directions of the first member 31 and the second member 32. As shown in FIG. 4, the first member 31 and the second member 32 extend horizontally and overlap completely in a vertical direction. The third member 33 extends vertically.

Figure 5:
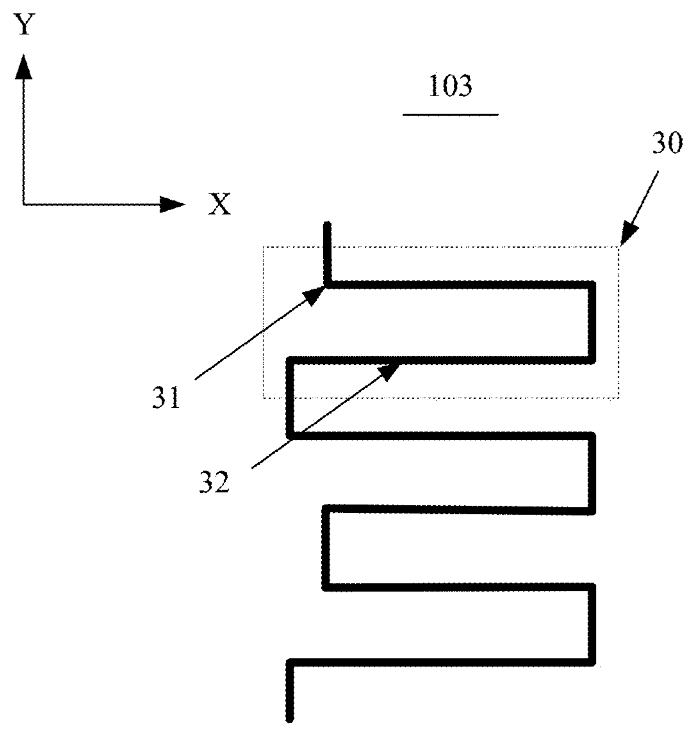
FIG. 5 illustrates a schematic structural diagram of another interference reduction device according to some embodiments of the present disclosure.

FIG. 5 illustrates a schematic structural diagram of another interference reduction device according to some embodiments of the present disclosure. Compared to the embodiment shown in FIG. 4, in FIG. 5, the first member 31 and the second member 32 of the structural feature 30 are configured to have different lengths. The first member 31 and the second member 32 are partially arranged to face each other in the reference direction.

In some embodiments, the first member 31, the second member 32, and the third member 33 are exemplarily shown as straight lines. In some other embodiments, at least one of the first member 31, the second member 32, or the third member 33 can be a curved line or a broken line. The curve line can include an arc or a wavy line with a plurality of segments.

Figure 6:
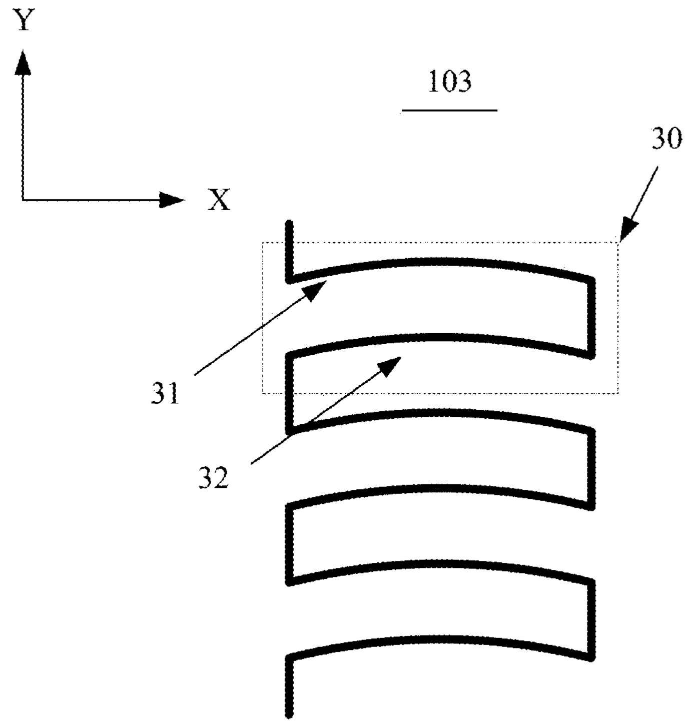
FIG. 6 illustrates a schematic structural diagram of another interference reduction device according to some embodiments of the present disclosure.

FIG. 6 illustrates a schematic structural diagram of another interference reduction device according to some embodiments of the present disclosure. Compared to the embodiment shown in FIG. 4, in FIG. 6, the first member 31 and the second member 32 are arcs.

Figure 7:
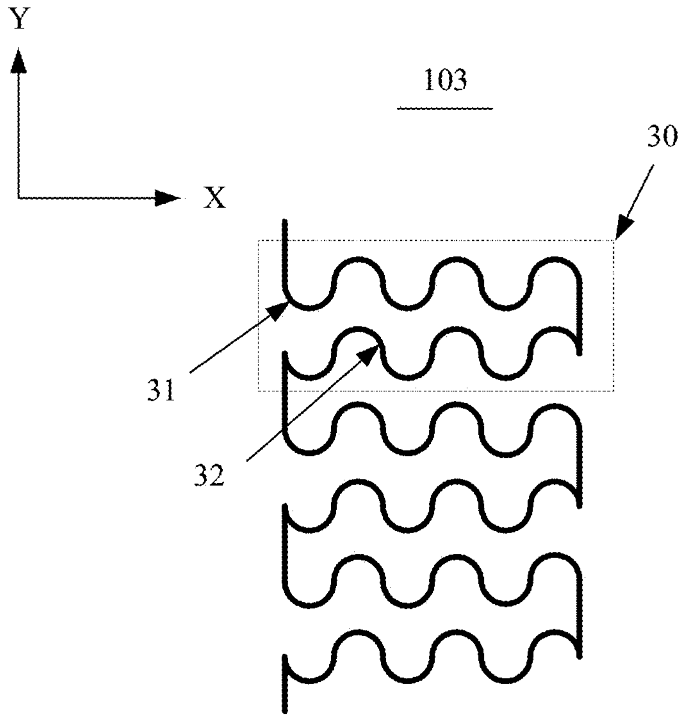
FIG. 7 illustrates a schematic structural diagram of another interference reduction device according to some embodiments of the present disclosure.

FIG. 7 illustrates a schematic structural diagram of another interference reduction device according to some embodiments of the present disclosure. Compared to the arrangement shown in FIG. 4, in FIG. 7, the first member 31 and the second member 32 are wavy lines.

In some embodiments of the present disclosure, a graphical structure of the interference reduction device 103 can be configured as needed and is not limited to the embodiment where the structural feature 30 includes the first member 31, the second member 32, and the third member 33.

Figure 8:
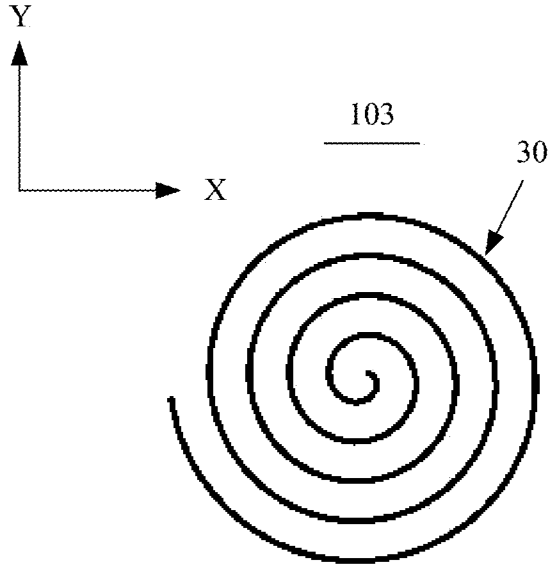
FIG. 8 illustrates a schematic structural diagram of another interference reduction device according to some embodiments of the present disclosure.

FIG. 8 illustrates a schematic structural diagram of another interference reduction device according to some embodiments of the present disclosure. The interference reduction device 103 has a spiral structure. The structural feature 30 is a coil segment of the spiral structure.

A graphical structure of the interference reduction device 103 can be selected based on the internal space of the electronic device. In some embodiments of the present disclosure, a specific implementation of the interference reduction device 103 is not limited.

In some embodiments of the present disclosure, the plane where the interference reduction device 103 is located is parallel to the first reference plane XY.

The first reference plane XY can be arranged perpendicular to a second reference plane. Thus, the structure of the electronic device is shown in FIG. 9 or FIG. 10.

Figure 9:
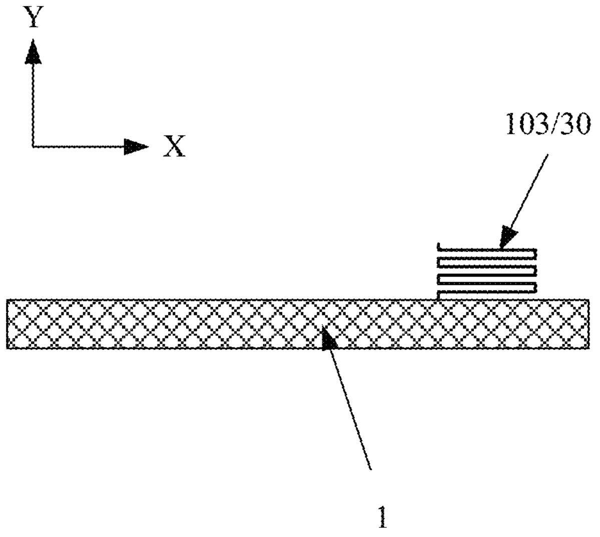
FIG. 9 illustrates a schematic structural diagram of another electronic device according to some embodiments of the present disclosure.
Figure 10:
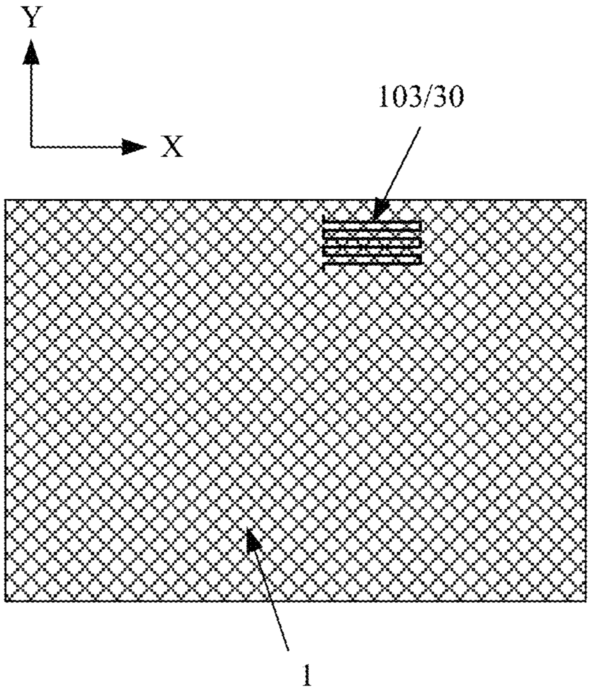
FIG. 10 illustrates a schematic structural diagram of another electronic device according to some embodiments of the present disclosure.

FIG. 9 illustrates a schematic structural diagram of another electronic device according to some embodiments of the present disclosure. The electronic device includes a circuit board 1. FIG. 9 shows a side view of the circuit board 1. The vertical direction in FIG. 9 represents a thickness direction of the circuit board 1. In FIG. 9, the second reference plane is set parallel to the plane where the circuit board 1 is located. The first reference plane XY is perpendicular to the plane where the circuit board 1 is located.

As shown in FIG. 9, the first reference plane XY is set perpendicular to the plane where the circuit board 1 is located. Thus, the plane where the interference reduction device 103 is located is perpendicular to the circuit board 1, which reduces the installation area occupied by the circuit board 1.

When the first reference plane is perpendicular to the plane where the circuit board 1 is located, the interference reduction device 103 can be arranged above the surface of the circuit board 1 or inside the circuit board 1.

The circuit board 1 can be a printed circuit board (PCB) with a plurality of metal layers in the thickness direction. When the interference reduction device 103 is arranged inside the circuit board 1, the first member 31 and the second member 32 of the structural feature 30 can be arranged at two neighboring metal layers, and the third member 33 can be a conductive via connecting the first member 31 and the second member 32. Thus, the interference reduction device 103 can be fabricated by reusing the metal layers of the circuit board 1 without occupying a space on the surface of the circuit board 1.

FIG. 10 illustrates a schematic structural diagram of another electronic device according to some embodiments of the present disclosure. FIG. 10 shows a top view of the circuit board 1. The first reference plane XY is parallel to the plane where the circuit board 1 is located. Thus, the second reference plane is arranged perpendicular to the plane where the circuit board 1 is located.

As shown in FIG. 10, the first reference plane is arranged parallel to the plane where the circuit board 1 is located. Thus, the plane where the interference reduction device 103 is located is parallel to the circuit board 1, which reduces the thickness of the electronic device.

In some embodiments of the present disclosure, whether the interference reduction device 103 is arranged as the implementation shown in FIG. 9 or FIG. 10 can be determined based on a surface arrangement space of the circuit board 1 of the electronic device. When a relatively large remaining space is available for arranging the interference reduction device 103 at the surface of the circuit board 1, the interference reduction device 103 can be arranged as the implementation shown in FIG. 10. When a relatively small remaining space of the surface of the circuit board 1 is not sufficient for arranging the interference reduction device 103, the interference reduction device 103 can be arranged as the implementation shown in FIG. 9.

The interference reduction device 103 can be arranged inside the circuit board 1 or on the surface of the circuit board 1. Arranging the interference reduction device 103 on the surface of the circuit board 1 can include that the interference reduction device 103 is in contact with the surface of the circuit board 1, or the interference reduction device 103 is arranged above the surface of the circuit board 1 at a distance.

In some embodiments, the interference reduction device 103 can be fixed above the surface of the circuit board 1 through a bracket to maintain a certain distance from the circuit board 1 to form a clearance with a metal ground of the circuit board. In some other embodiments, the interference reduction device can be arranged in contact with the surface of the circuit board 1 or inside the circuit board 1. Thus, a hollow processing may need to be performed on the metal ground of the circuit board 1 and a corresponding area of the interference reduction device 103 to form the clearance.

When the interference reduction device 103 is arranged on the surface of the circuit board 1, the interference reduction device 103 may not overlap with other electronic elements mounted on the circuit board 1.

An operating frequency of the first antenna 101 can be set to f1, and an operating frequency of the second antenna 102 can be set to f2. In the electronic device, the operating frequency of the first antenna 101 and the operating frequency of the second antenna 102 can include at least one of the following conditions. In some embodiments, the operating frequency of the first antenna 101 can overlap with the operating frequency of the second antenna 102. That is, f1 can be the same as or close to f2. In some other embodiments, the multiple of the operating frequency of the first antenna 101 can overlap with the operating frequency of the second antenna 102. That is, the multiple f1 can be equal to or close to f2.

When the operating frequency of the first antenna 101 overlaps with the operating frequency of the second antenna 102, and/or the multiple of the operating frequency of the first antenna 101 overlaps with the operating frequency of the second antenna 102, a relatively strong mutual influence can exist between the first antenna 101 and the second antenna 102. By setting the interference reduction device, interference of radiation signals between the first antenna 101 and the second antenna 102 can be reduced.

In some embodiments of the present disclosure, a length of the interference reduction device 103 of the electronic device can be related to one of the operating frequency f1 of the first antenna 101 or the operating frequency f2 of the second antenna 102.

The length of the interference reduction device 103 can be set to be related to the operating frequency f1 of the first antenna 101 and/or the operating frequency f2 of the second antenna 102. With the effective coupling operating frequency of the interference reduction device 103, the radiation interference of the antenna related to the interference reduction device 103 on another antenna can be reduced.

When the length of the interference reduction device 103 is related to the operating frequency f1 of the first antenna 101, the first antenna 101 can be the antenna that generates the radiation interference (also referred to as interference antenna, and the second antenna 102 can be the interfered antenna. By coupling the electromagnetic wave radiated by the first antenna 101 through the interference reduction device 103, the interference of the radiated electromagnetic wave of the first antenna 101 on the second antenna 102 can be reduced.

When the length of the interference reduction device 103 is related to the operating frequency f2 of the second antenna 102, the second antenna 102 can be the antenna that generates the radiation interference, and the first antenna 101 can be the interfered antenna. By coupling the electromagnetic wave radiated by the second antenna 102 through the interference reduction device 103, the interference of the radiated electromagnetic wave of the second antenna 102 on the first antenna 101 can be reduced.

Figure 11:
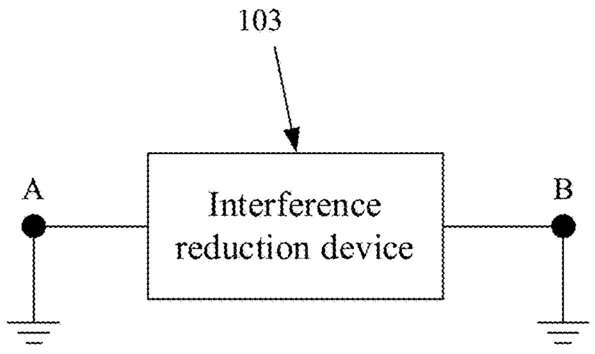
FIG. 11 illustrates a schematic diagram showing a wiring method at two ends of an interference reduction device according to some embodiments of the present disclosure.

FIG. 11 illustrates a schematic diagram showing a wiring method at two ends of the interference reduction device 103 according to some embodiments of the present disclosure. The interference reduction device 103 includes a first end A and a second end B. As shown in FIG. 11, the first end A and the second end B are illustrated to be short.

In some embodiments of the present disclosure, the wiring method at the two ends of the interference reduction device 103 can be set as needed and is not limited to the method shown in FIG. 11. States of the first end A and the second end B can include one of the following three methods.

In method 1, both the first end A and the second end B are short.

In method 2, both the first end A and the second end B are open.

In method 3, one of the first end A and the second end B is short.

In this case, the first end A or the second end B of the interference reduction device 103 being short can indicate that an RF signal is short, while the first end A or the second end B being open can indicate that the RF signal is open. The length of the interference reduction device 103 can be a length of a current path from the first end A to the second end B.

Assume that the interference reduction device 103 can couple an electromagnetic wave with a frequency f and a wavelength λ, and the length of the interference reduction device 103 can be L.

If method 1 or method 2 is adopted, the length of the interference reduction device 103 can satisfy the following relationship.

$$L = N * \frac{\lambda}{2} \tag{1}$$

In Equation (1), N is a positive integer.

Assume that the propagation speed of the electromagnetic wave is the speed of light c, Equation (2) is obtained.

$$\lambda = \frac{c}{f} \tag{2}$$

By substituting Equation (2) into Equation (1), Equation (3) is obtained.

$$L = N * \frac{c}{2f} \tag{3}$$

For Equation (3), when the first antenna 101 is the antenna that generates the interference, the interference reduction device 103 may need to couple the electromagnetic wave radiated by the first antenna 101. Thus, f=f1. When the second antenna 102 is the antenna that generates the interference, the interference reduction device 103 may need to couple the electromagnetic wave radiated by the second antenna 102. Thus, f=f2.

If Method 3 is adopted, the length of the interference reduction device 103 can satisfy the following relationship.

$$L = N * \frac{\lambda}{4} \tag{4}$$

By substituting Equation (2) into Equation (4), Equation (5) is obtained.

$$L = N * \frac{c}{4f} \tag{5}$$

Similarly, for Equation (5), when the first antenna 101 is the antenna that generates the interference, the interference reduction device 103 may need to couple the electromagnetic wave radiated by the first antenna 101. Thus, f=f1. When the second antenna 102 is the antenna that generates the interference, the interference reduction device 103 may need to couple the electromagnetic wave radiated by the second antenna 102. Thus, f=f2.

From the above description, when the interference antenna and the wiring method at both ends of the interference reduction device 103 are determined, the length of the interference reduction device 103 can be calculated based on Equation (3) or Equation (5).

If the first reference plane XY is set parallel to the plane where the circuit board 1 is located, an area on the surface of the circuit board 1 used for arranging the interference reduction device 103 can be determined. The length L of the interference reduction device 103 can be calculated based on Equation (3) or Equation (5) in different wiring methods. Based on the determined length L and the arrangement area, the graphical structure of the interference reduction device 103 can be configured.

By employing the technical solution of the present disclosure, a relatively good isolation effect can be achieved for the first antenna 101 and the second antenna 102 through the interference reduction device 103.

The interference reduction device 103 can cause an isolation degree between the first antenna 101 and the second antenna 102 to satisfy a target condition. A number of structural features 30 can be positively correlated with the isolation degree between the first antenna 101 and the second antenna 102. That is, with more structural features 30, the isolation effect between the first antenna 101 and the second antenna 102 can be better.

The target condition that is satisfied by the first antenna 101 and the second antenna 102 by using the interference reduction device 103 can include that the isolation degree between the first antenna 101 and the second antenna 102 does not exceed 15 dBa.

Figure 12:
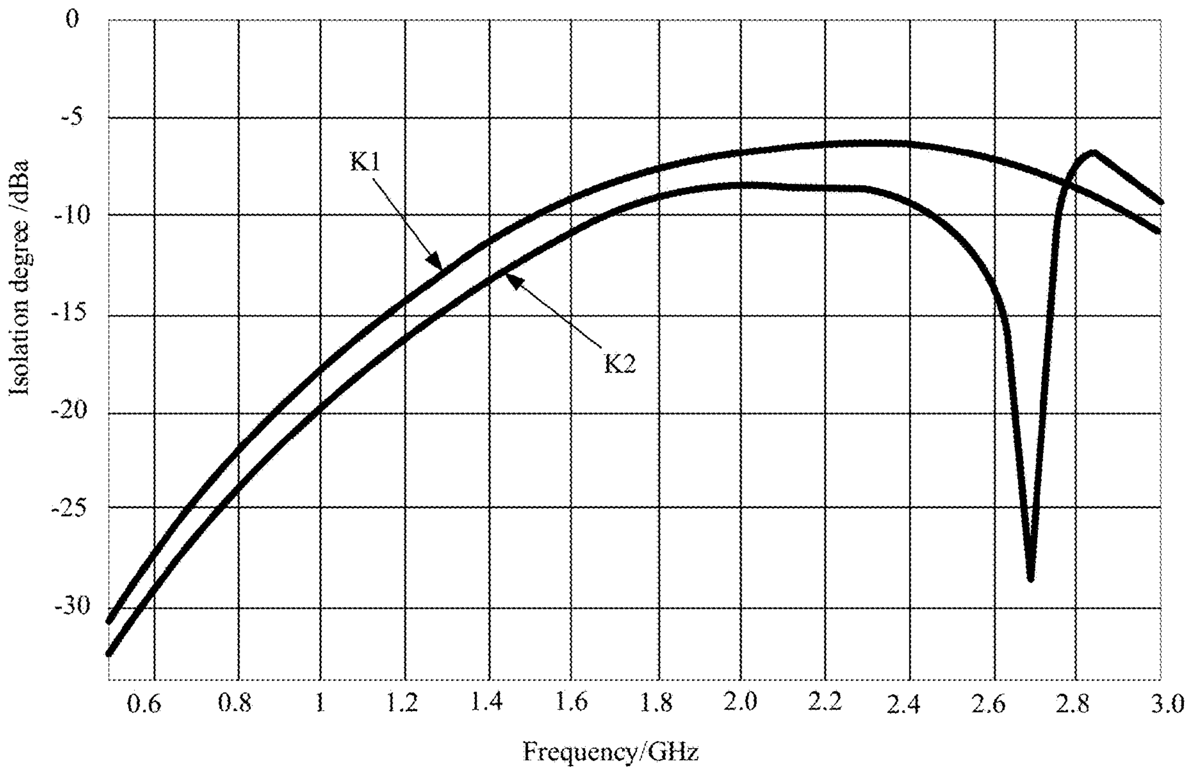
FIG. 12 illustrates a schematic diagram showing a parameter curve of an antenna S according to some embodiments of the present disclosure.

FIG. 12 illustrates a schematic diagram showing an S-parameter curve of an antenna according to some embodiments of the present disclosure. A horizontal axis represents the operating frequency of the antenna in GHz, and a vertical axis represents the isolation degree of the antenna in dBa. Curve K1 represents an S-parameter curve of antenna 3 and antenna 8 of the electronic device without the interference reduction device 103 in the present disclosure, while curve K2 represents an S-parameter curve of antenna 3 and antenna 8 of the electronic device with the interference reduction device 103. By comparing curve K1 and curve K2, the isolation degree between antenna 3 and antenna 8 is significantly reduced by using the technical solution of the present disclosure when antenna 3 and antenna 8 of the electronic device are at the operating frequency of 2.7 GHz.

In some embodiments of the present disclosure, the electronic device can be an electronic device having a communication function, such as a cell phone, a laptop, a tablet, or a smart wearable device.

Figure 13:
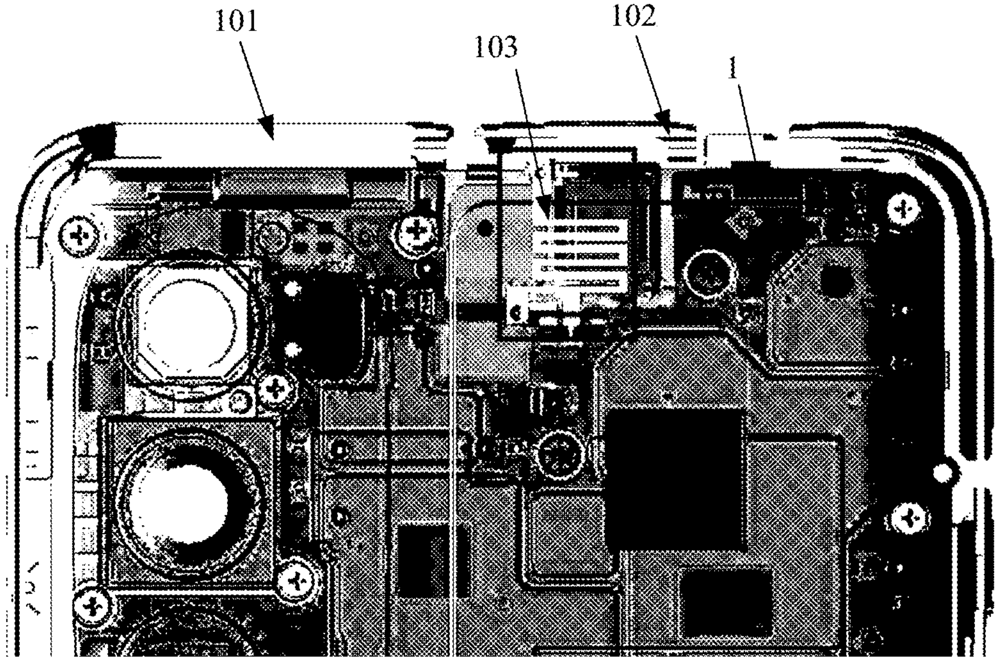
FIG. 13 illustrates a schematic structural diagram of an electronic device according to some embodiments of the present disclosure.

FIG. 13 illustrates a schematic structural diagram of an electronic device according to some embodiments of the present disclosure. In FIG. 13, the electronic device is illustrated as a cell phone. The plane where the interference reduction device 103 is located is parallel to the circuit board 1. The first antenna 101 and the second antenna 102 are metal sidewalls at an end of the house of the electronic device.

A gap exists between the first antenna 101 and the second antenna 102. Since the antenna arrangement space of the electronic device is limited to the miniaturization and lightweight design of the electronic device, the gap cannot exceed 1.5 mm. Thus, the first antenna 101 and the second antenna 102 can have a relatively strong mutual interference. The interference between different antennas can be reduced by arranging the interference reduction device 103 in the technical solution of the present disclosure.

A same side surface of the circuit board 1 can be fixedly connected to a control chip and at least one electronic element. When the interference reduction device 103 is located on the surface of the circuit board 1, the interference reduction device 103 can be reused as the connector between the electronic element and the control chip. The electronic element can include one of a speaker, a temperature sensor, or an optical sensor.

The control chip can interact with the electronic element through the connectors in a DC signal. When the interference reduction device 103 couples the electromagnetic wave and reduces the radiation of the electromagnetic wave, the RF signal can be processed. Therefore, based on different characteristics of the DC signal and the RF signal, the interference of the RF signal on the DC signal can be filtered out through a capacitor and/or an inductor. Thus, the interference reduction device 103 can be reused as the connector between the electronic element and the control chip.

Figure 14:
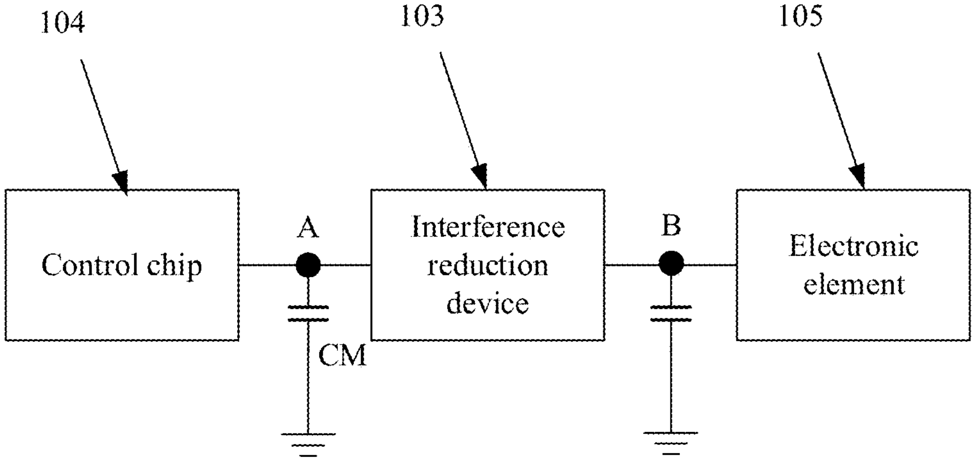
FIG. 14 illustrates a schematic diagram showing a principle of reusing an interference reduction device as a connector according to some embodiments of the present disclosure.

FIG. 14 illustrates a schematic diagram showing a principle of reusing the interference reduction device as the connector according to some embodiments of the present disclosure. The interference reduction device 103 is connected between the control chip 103 and the electronic element 105. In some embodiments, the first end A is connected to the control chip 104, and the second end B is connected to a pin. To prevent the RF signal coupled by the interference reduction device 103 from interfering the DC interaction signal between the control chip 14 and the electronic element 105, the first end A and the second end B are RF-short through a capacitor CM, respectively. That is, the two ends of the interference reduction device 103 are RF-short.

Figure 15:
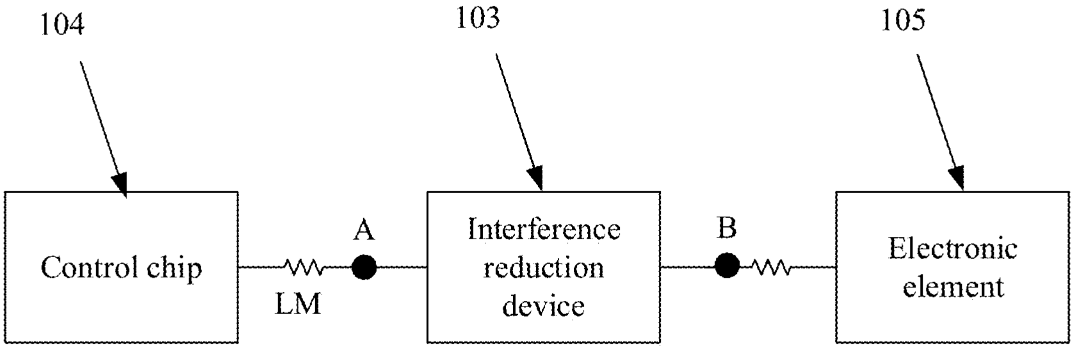
FIG. 15 illustrates a schematic diagram showing another principle of reusing an interference reduction device as a connector according to some embodiments of the present disclosure.

FIG. 15 illustrates a schematic diagram showing another principle of reusing the interference reduction device as the connector according to some embodiments of the present disclosure. The interference reduction device 103 is connected between the control chip 103 and the electronic element 105. To prevent the RF signal coupled by the interference reduction device 103 from interfering the DC interaction signal between the control chip 14 and the electronic element 105, an inductor LM is connected between the first end A and the control chip 104, and an inductor LM is connected between the second end B and the electronic element 105. That is, the two ends of the interference reduction device 103 can be RF-circuit opened.

Embodiments of the present disclosure are described in a progressive, parallel, or combined method thereof. Each embodiment focuses on the differences from other embodiments, and the same or similar parts among the embodiments can be referred to each other.

In the description of the present disclosure, the accompanying drawings and descriptions of embodiments of the present disclosure are illustrative and are not restrictive. The same drawing labels throughout embodiments in the specification can identify the same structures. In addition, to facilitate understanding and description, the thicknesses of layers, films, panels, and areas can be exaggerated in the drawings. When an element, such as a layer, a film, an area, or a substrate, are described as being "on" another element, the element can be directly on the another element or can have an intermediate element in between. Furthermore, "on" can refer to positioning an element above or below another element. Thus, "on" does not necessarily mean that the element is positioned on top of the another element according to the direction of gravity.

An orientation or a position relationship indicated by the terms such as "above," "below," "top," "bottom," "in," and "out" can be based on the orientation and the position relationship shown in the drawings and can be solely for the purpose of facilitating the description of the present disclosure and simplifying the description. The terms are not intended to indicate or imply that the devices or elements referred to must have a specific orientation and be constructed or operated in a particular orientation. Thus, the terms do not limit the present disclosure. When an assembly is considered to be "connected" to another assembly, the assembly can be directly connected to the another assembly or can have an intermediate element therebetween.

Furthermore, relationship terms such as first and second are used merely to distinguish one entity or operation from another, and do not necessarily require or imply any actual relationship or sequence between these entities or operations. Moreover, the terms "including," "comprising," or any other variations thereof are intended to encompass non-exclusive inclusion, such that a product or device comprising a series of elements not only includes those elements, but also includes other elements not explicitly listed, or also includes the elements inherent to the product or the device. When there is no further limitation, the element limited by "including a" does not exclude that the product or device including the above elements also include other same elements.

The above description of embodiments of the present disclosure enables those skilled in the art to implement or use the present disclosure. Various modifications of embodiments are apparent to those skilled in the art. The general principles defined herein can be applied to other embodiments without departing from the spirit or scope of the present disclosure. Therefore, the present disclosure is not limited to embodiments of the present disclosure, but conforms to the widest scope consistent with the principles and novel features of the present disclosure.

What is claimed is:

1. An electronic device comprising:

a circuit board;

a first antenna arranged at a first position;

a second antenna arranged at a second position different from the first position; and an interference reduction device arranged at a third position different from the first position and the second position and having a plurality of structural features to couple an electromagnetic wave and reduce radiation of the electromagnetic wave, wherein each of the plurality of structural features comprises a bent metal component including a first member, a second member, and a third member, the first member and the second member are disposed at different distances from a reference plane and at least partially overlap in a reference direction perpendicular to the reference plane, the reference plane is parallel to a plane of the circuit board, the third member is oriented along the reference direction and connects a first end of the first member to a first end of the second member, wherein the interference reduction device includes a first end and a second end, and at least one of the first end of the interference reduction device or the second end of the interference reduction device is grounded.

2. The electronic device according to claim 1, wherein:

in response to exciting the first antenna to generate a radiation path, the second position of the second antenna is on the radiation path, the radiation path being formed by the radiation of the electromagnetic wave generated by exciting the first antenna; and the third position of the interference reduction device is on the radiation path from the first antenna to the second antenna.

3. The electronic device according to claim 1, wherein a first reference plane is perpendicular to the reference plane.

4. The electronic device according to claim 1, wherein:

the operating frequency of the first antenna overlaps with the operating frequency of the second antenna; or a multiple of the operating frequency of the first antenna overlaps with the operating frequency of the second antenna.

5. The electronic device according to claim 4, wherein:

a length of the interference reduction device is related to the operating frequency of the first antenna; or the length of the interference reduction device is related to the operating frequency of the second antenna.

6. The electronic device according to claim 1, wherein:

the interference reduction device causes an isolation degree between the first antenna and the second antenna to satisfy a target condition; and a quantity of the plurality of structural features is positively correlated with the isolation degree between the first antenna and the second antenna.

7. The electronic device according to claim 1, wherein both the first end of the interference reduction device and the second end of the interference reduction device are grounded.

8. The electronic device according to claim 1, wherein one of the first end of the interference reduction device and the second end of the interference reduction device is grounded, and an other of the first end of the interference reduction device and the second end of the interference reduction device is open.

9. The electronic device according to claim 1, wherein any pair of adjacent structural features of the plurality of structural features are connected by a connecting member at a second end of the second member of one of the pair of adjacent structural features and a second end of the first member of an other of the pair of adjacent structural features, and the connecting member is substantially parallel to the third members of the pair of adjacent structural features.

10. The electronic device according to claim 1, wherein at least one of the first member or the second member of at least one of the plurality of structural features includes an arc-shaped portion.

11. The electronic device according to claim 1, wherein at least one of the first member or the second member of at least one of the plurality of structural features includes a wavy line-shaped portion.

* * * * *